(12) United States Patent
Yang et al.

(10) Patent No.: US 7,835,090 B1
(45) Date of Patent: Nov. 16, 2010

(54) CLUTCHING JIG

(75) Inventors: Yi Chang Yang, Tu-Cheng (TW); Kuo Chuan Chiu, Tu-Cheng (TW); Feng Chi Lee, Tu-Cheng (TW); Chin Chou Wang, Tu-Cheng (TW)

(73) Assignee: Cheng Uei Precision Industry Co. Ltd., Taipei Hsien (TW)

( * ) Notice: Subject to any disclaimer, the term of this patent is extended or adjusted under 35 U.S.C. 154(b) by 0 days.

(21) Appl. No.: 12/453,283

(22) Filed: May 6, 2009

(51) Int. Cl.
*G02B 7/02* (2006.01)
*G02B 3/00* (2006.01)

(52) U.S. Cl. .................... 359/808; 359/809; 359/819
(58) Field of Classification Search ......... 359/694–700, 359/808–824; 396/319–427
See application file for complete search history.

(56) References Cited

U.S. PATENT DOCUMENTS 7,359,129 B2 * 4/2008 Chiu et al. .................. 359/809
7,515,366 B2 * 4/2009 Chang ........................ 359/824
7,746,585 B2 * 6/2010 Chang ........................ 359/891

\* cited by examiner

*Primary Examiner*—Mohammed Hasan
(74) *Attorney, Agent, or Firm*—Rosenberg, Klein & Lee

(57) ABSTRACT

A clutching jig used to disassemble a lens module which includes a lens socket and a lens component mounted to the lens socket by a plurality of buckling pieces of the lens socket abutting a top and a side of the lens component defines a housing having a base. The base has an inserting hole. A bottom of the base has a holding wall for pressing the buckling pieces apart from the lens component. A top of the base has a pair of connecting walls. Two clutching arms are rotatably mounted to the housing. Each of the clutching arms has a fixing plate. An end of a top side of the fixing plate has a holding bar. An end of a bottom side of the fixing plate defines a clutching slice for holding the lens component when the holding bars are urged to approach each other, in disassembly.

6 Claims, 5 Drawing Sheets

CLUTCHING JIG

BACKGROUND OF THE INVENTION

1. Field of the Invention

The invention relates to a clutching jig, and more particularly to a clutching jig for conveniently disengaging a lens component from a lens socket.

2. The Related Art

Please refer to FIG. 6, a conventional lens module includes a lens socket 60 and a lens component 50 mounted into the lens socket 60. The lens component 50 defines a base 51, a lens body 52 located on the base 51. The lens body 52 has a fool-proof projection 53 protruding outwards from a side thereof. The lens socket 60 has an insulating housing 61 and a metal shell 62 enclosing the insulating housing 61. The metal shell 62 has a plurality of buckling pieces 621 that rest against a top and a sidewall of the body 51 for fastening the lens component 50 in the lens socket 60, when the lens component 50 is inserted into the lens socket 60. Such engagement structure results in difficulty to separate the lens component 50 from the lens socket 60, especially when the lens module is located in a mobile phone or other miniature electronic devices. Therefore, it is desirable to design a clutching jig which has a simple structure and is capable of easily clutching the lens component 50 out of the lens socket 60.

SUMMARY OF THE INVENTION

An object of the present invention is to provide a clutching jig with a simple structure capable of disassembling a lens module which includes a lens socket and a lens component mounted to the lens socket by a plurality of buckling pieces of the lens socket abutting a top and a side of the lens component defines a housing having a base. The base has an inserting hole at a middle portion thereof with a shape depending on the lens component. A bottom of the base protrudes outwards from a middle thereof to form a holding wall enclosing the inserting hole, with a peripheral shaped depending on the lens socket, for pressing the buckling pieces apart from the lens component. A top of the base extends upwards to form a pair of facing connecting walls which are arranged symmetrical about the inserting hole. Two clutching arms are rotatably mounted to the housing. Each of the clutching arms has a fixing plate mounted between the connecting walls. An end of a top side of the fixing plate extends upwards to form a holding bar aligned with each other and exposing the housing. An end of a bottom side of the fixing plate extends downwardly to form a clutching slice biased from the holding arm. The clutching slice is located in the holding wall and aligned with each other to define a first locating line which is perpendicular to a second locating line defined by the aligned two connecting walls, for holding the lens component when the holding bars are urged to approach each other, in disassembly.

As described above, the lens component partly receives into the inserting hole and the holding wall pushes the bulking pieces of the lens socket away from the lens component The lens component is released by the bulking pieces. After that, the holding bars are urged to approach each other to make the clutching slice clutching the lens component. When the user pulls the clutching jig upwardly, the lens component will be released from the lens socket. So the clutching jig with a simple structure facilitates clutching the lens component out of the lens socket.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
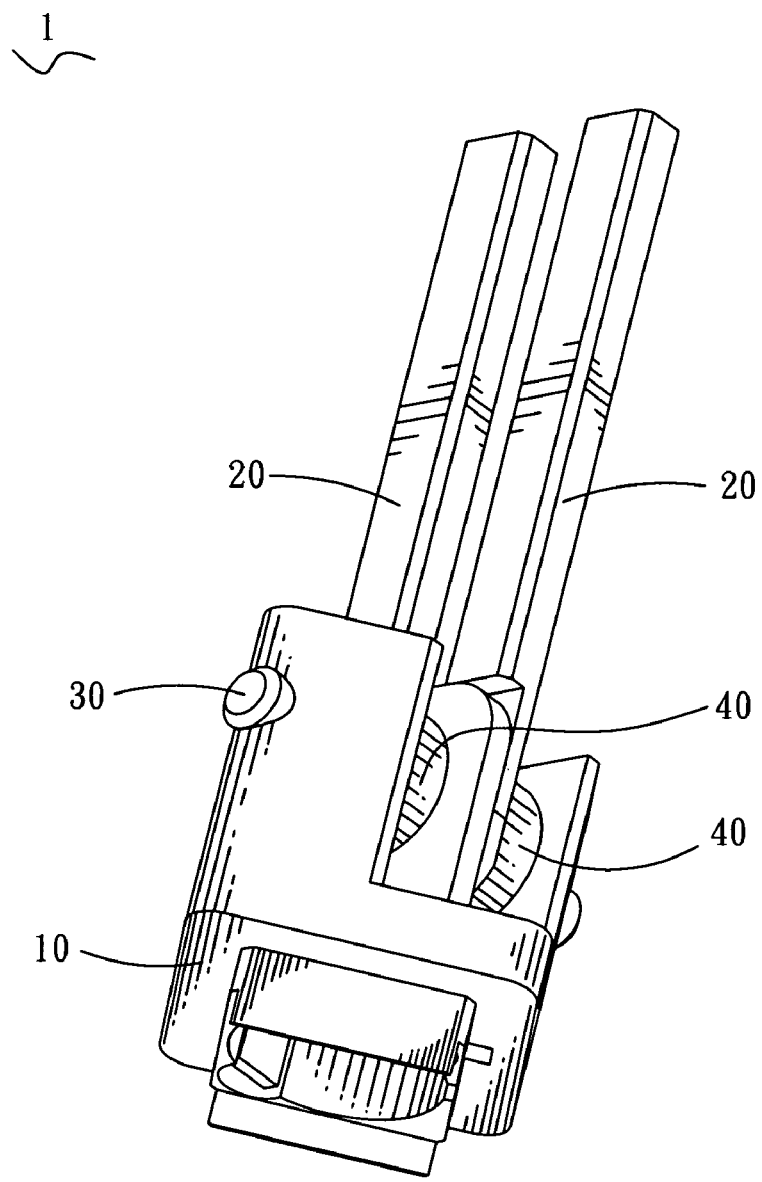
FIG. 1 is a perspective view of a clutching jig according to the present invention.
Figure 2:
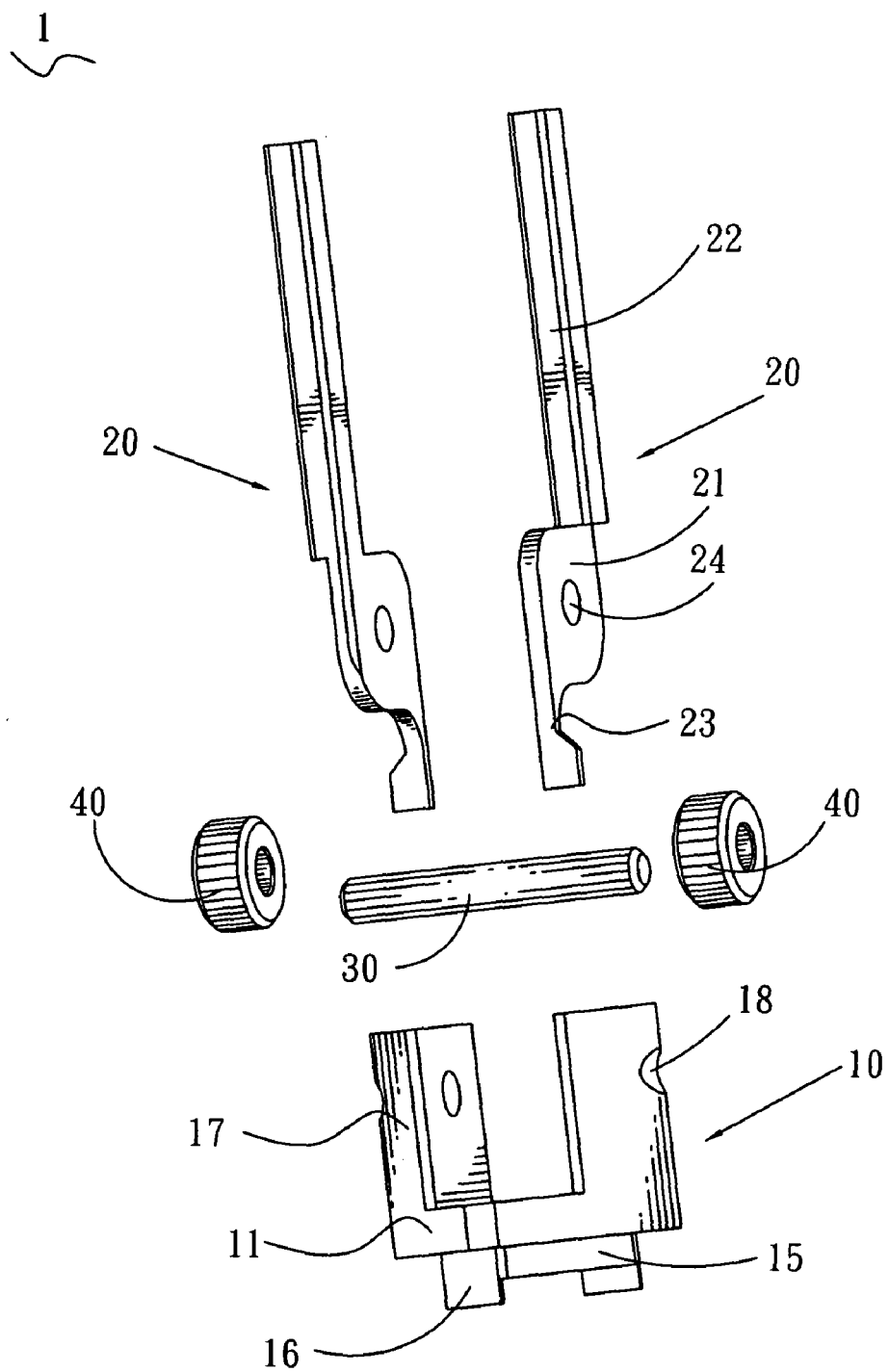
FIG. 2 is an exploded view of the clutching jig shown in FIG. 1.
Figure 3:
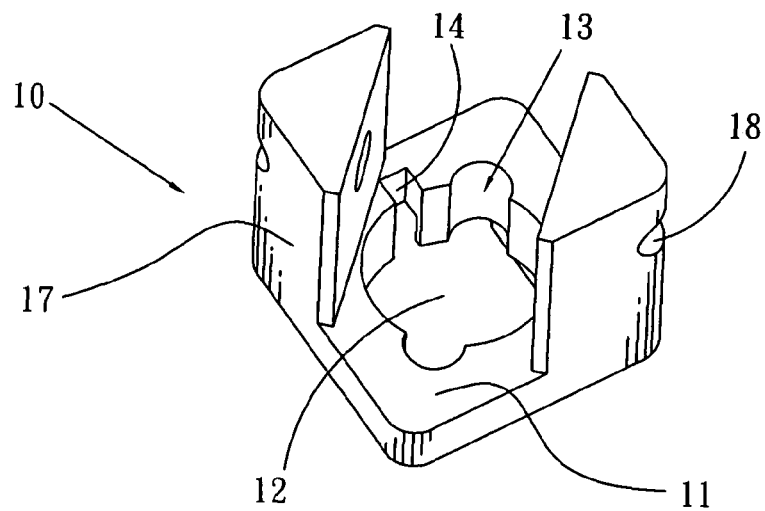
FIG. 3 is a perspective view of a housing of the clutching jig shown in FIG. 2.
Figure 4:
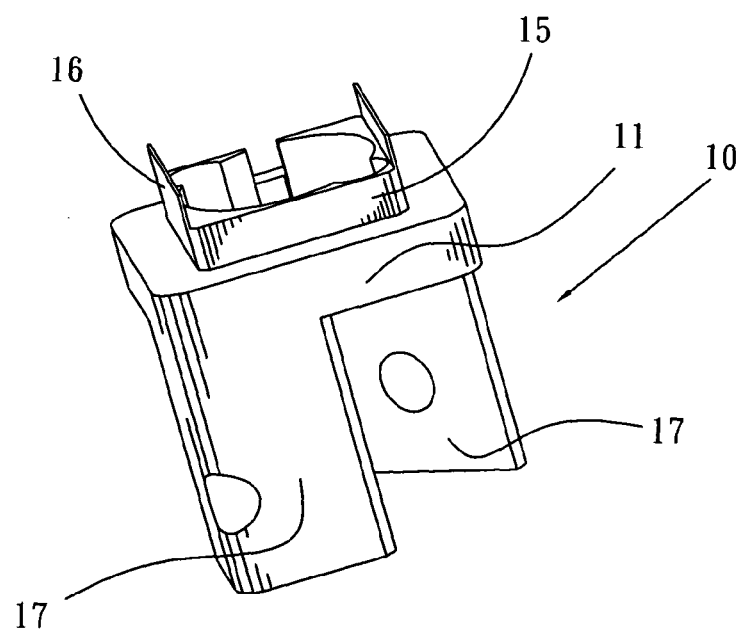
FIG. 4 is a perspective view of the housing of the clutching jig shown in FIG. 3 seen from another direction.

Please refer to FIGS. 1-4 and FIG. 6, a clutching jig 1 according to the present invention is shown. The clutching jig 1 includes a housing 10, two clutching arms 20 rotatably mounted to the housing 10. The housing 10 has a rectangular base 11. The base 11 has an inserting hole 12 at a middle portion thereof with a shape depending on the lens component 50. An inner side of the inserting hole 12 has two notches 13 along one diagonal line of the base 11, facing each other, and a fool-proof recess 14 adjacent to one of the notch 13, corresponding to the fool-proof projection 53 of the lens component 50. A bottom of the base 11 has a portion protruding outwards to form a holding wall 15 enclosing the inserting hole 12, with a periphery formed to show a rectangular shape, for inserting into the lens module along an inner side of the lens socket 60 to press the bulking pieces 621 apart from the lens component 50. The holding wall 15 has two opposite outer surfaces extended downwards to form two inserting slices 16 which are adapted for being inserted into a gap between the lens socket 60 and the lens component 50 to press the buckling pieces 621 against the sidewall of the body 51. A top of the base 11 extends upwards to form a pair of connecting walls 17 which are arranged along the other diagonal line of the base 11 and symmetrical about the inserting hole 12. The connecting wall 17 defines a connecting hole 18 at a middle portion thereof.

Each of the clutching arms 20 has a rectangular fixing plate 21. The fixing plate 21 is formed with a fixing hole 24 in a substantial middle portion thereof. The fixing plate 21 extends upwards to form a holding bar 22 at an end of a top side thereof, and protrudes downwards to form a clutching slice 23 at an end of a bottom side thereof and biased from the holding arm 20. In this embodiment, the thickness of the fixing plate 21 is substantially half of that of the holding bar 22, and the clutching slice 23 is substantially L-shaped.

Figure 5:
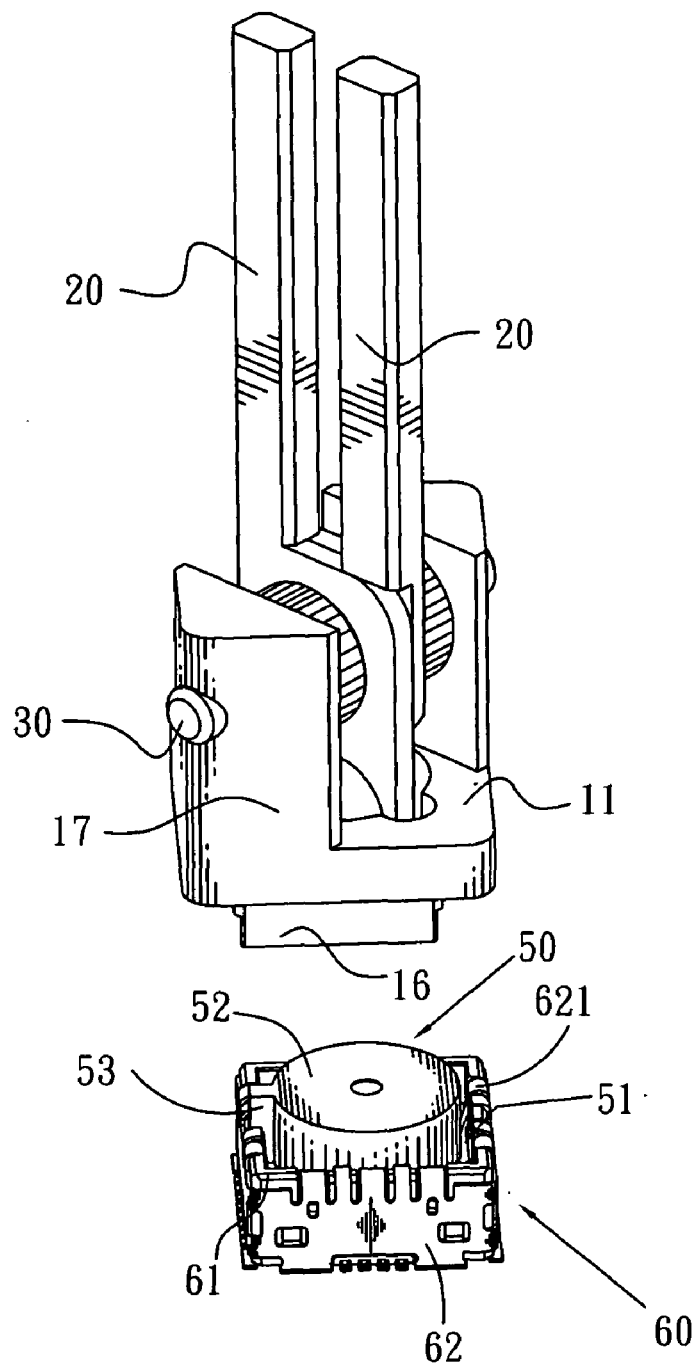
FIG. 5 is a perspective view of the clutching jig shown in FIG. 1, wherein a lens module is provided.

With reference to FIG. 5, in assembly, The clutching arms 20 are located between the connecting walls 17 in an opposite way, with the fixing plates 21 plate-to-plate oppositely abutting to each other and the holding bars 22 in alignment with each other. A pivoting rob 30 is provided to pass through the connecting holes 18 and the fixing holes 24 of the fixing plates 21 for fixing the clutching arms 20 between the connecting walls 17. In this embodiment, there is a pair of elastic washers 40 of ring shape which are disposed between the fixing plates 21 and the connecting walls 17, respectively, for preventing the fixing plates 21 from moving. The clutching slices 23 are received in the notches 13.

Figure 6:
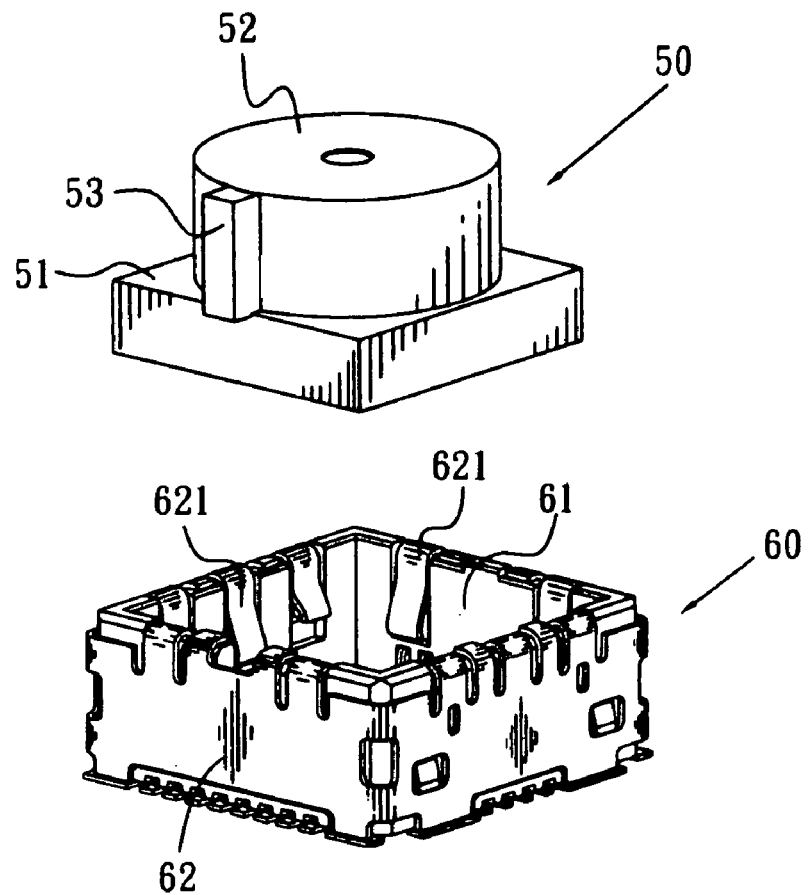
FIG. 6 is a perspective view of the lens module shown in FIG. 5, wherein a lens component is separated from a lens socket.

Referring to FIGS. 5-6, when the clutching jig 1 is used to separate the lens component 50 from the lens socket 60, the clutching jig 1 is firstly adjusted and positioned by the foolproof projection 53 inserted into the fool-proof recess 14. The lens body 52 is received in the inserting hole 12. The holding wall 15 pushes the bulking pieces 621 abutting the top of the body 51 away from the lens component 50, and the inserting slices 16 are inserted between the lens socket 60 and the lens component 50 and press the buckling pieces 621 against the sidewall of the body 51, so that the lens component 50 is separated from the bulking pieces 621. At this time, the holding bars 22 are gripped to approach each other, to make the clutching slice 23 clutched the lens component 50, and pulled upwardly with the lens component 50. Thus the lens component 50 is released from the lens socket 60.

As describe above, the structure of the clutching jig 1 is simple and compact. The operation process of the clutching jig 1 disengaging the lens component 50 from the lens socket 60 is easy and convenient, furthermore, without damaging the fixing structure therebetween. So the clutching jig 1 is excellent and can be used widely.

Furthermore, the present invention is not limited to the embodiment described above; various additions, alterations and the like may be made within the scope of the present invention by a person skilled in the art. For example, respective embodiments may be appropriately combined.

What is claimed is:

1. A clutching jig adapted to disassemble a lens module which includes a lens socket and a lens component mounted to the lens socket by a plurality of buckling pieces of the lens socket abutting a top and a side of the lens component, comprising:

a housing having a base, the base having an inserting hole at a middle thereof, with a shape depending on the lens component, a bottom of the base protruding outwards to form a holding wall enclosing the inserting hole, with a peripheral shape depending on the lens socket, for pressing the buckling pieces apart from the lens component, a top of the base extending upwards to form a pair of facing connecting walls which are symmetrical about the inserting hole; and two clutching arms mounted to the housing, each of the clutching arms having a fixing plate mounted between the connecting walls, an end of a top side of the fixing plate extending upwards to form a holding bar, an end of a bottom side of the fixing plate extending downwardly to form a clutching slice biased from the holding arm, wherein the fixing plates are rotatably mounted between the connecting walls, plate-to-plate abutting each other in an opposite way, the holding bars aligned with each other and exposing the housing, the clutching slices located within the holding wall and aligned with each other to define a first locating line which is perpendicular to a second locating line defined by the aligned two connecting walls, for holding the lens component when the holding bars are urged to approach each other in disassembly.

2. The clutching jig as claimed in claim 1, wherein the connecting walls and the fixing plates are formed with connecting holes and fixing holes, respectively, a pivoting rob is provided for fixing the fixing plates with the connecting walls.

3. The clutching jig as claimed in claim 2, further comprising a pair of elastic washers disposed between the fixing plates and the connecting walls, respectively.

4. The clutching jig as claimed in claim 1, wherein the base is rectangular, the connecting walls are arranged along one diagonal line of the base, an inner side of the inserting hole is formed with two notches along the other diagonal line of the base for receiving the clutching slice.

5. The clutching jig as claimed in claim 1, wherein the holding wall is capable of making the buckling pieces abutting the top of the lens component apart from the lens component and has two opposite outer surface extended downwards to form inserting slices for separating the buckling pieces against the sidewall of the lens component from the lens component.

6. The clutching jig as claimed in claim 1, wherein the peripheral shape of the holding wall is rectangular, the two connecting walls are arranged along one diagonal line of holding wall served as the second locating line, the clutching slices are located within the holding wall along the other diagonal line of the holding wall served as the first locating line.

* * * * *